(12) United States Patent
Thompson et al.

(10) Patent No.: US 7,086,769 B1
(45) Date of Patent: Aug. 8, 2006

(54) LED SIGNAGE DEVICE

(75) Inventors: Chris Thompson, Franklin, TN (US); David C. McFerrin, Sparta, TN (US); Joe Counts, Nashville, TN (US); Paul Morgan, Cookeville, TN (US); Timothy J. Thomas, Franklin, TN (US)

(73) Assignee: Identity Group, Inc., Cookeville, TN (US)

( * ) Notice: Subject to any disclaimer, the term of this patent is extended or adjusted under 35 U.S.C. 154(b) by 120 days.

(21) Appl. No.: 10/937,560

(22) Filed: Sep. 9, 2004

(51) Int. Cl.
G09F 13/04 (2006.01)
G09F 13/28 (2006.01)
F21V 3/02 (2006.01)

(52) U.S. Cl. .................. 362/559; 361/236; 40/550; 40/580

(58) Field of Classification Search ............. 362/227, 362/236–238, 240, 244, 246, 248, 252, 355, 362/800; 40/550–551, 564, 580
See application file for complete search history.

(56) References Cited

U.S. PATENT DOCUMENTS

| | | | |
|---|---|---|---|
| D161,715 S | 1/1951 | Siegel et al. | |
| D162,354 S | 3/1951 | Smith | |
| D162,637 S | 3/1951 | Ernst | |
| 3,056,221 A | 10/1962 | Brienza | |
| D214,860 S | 8/1969 | Avila | |
| 4,724,629 A * | 2/1988 | Walton | 40/451 |
| 4,967,317 A * | 10/1990 | Plumly | 362/613 |
| 4,976,057 A * | 12/1990 | Bianchi | 40/579 |
| 5,151,679 A * | 9/1992 | Dimmick | 340/326 |
| 5,533,286 A | 7/1996 | Fallon et al. | 40/545 |
| 6,361,186 B1 * | 3/2002 | Slayden | 362/249 |
| D456,850 S | 5/2002 | Fallon | D20/10 |
| D460,490 S | 7/2002 | Fallon | D20/10 |
| D477,032 S | 7/2003 | Fallon | |
| 6,592,238 B1 | 7/2003 | Cleaver et al. | |
| D484,916 S | 1/2004 | Fallon | D20/10 |
| 6,829,852 B1 * | 12/2004 | Uehran | 40/451 |
| 6,851,832 B1 * | 2/2005 | Tieszen | 362/249 |
| 6,964,507 B1 * | 11/2005 | Mohacsi | 362/545 |
| 6,969,179 B1 * | 11/2005 | Sloan et al. | 362/219 |
| 2002/0191386 A1 | 12/2002 | Cleaver et al. | |
| 2003/0019138 A1 * | 1/2003 | Lin | 40/550 |
| 2004/0255497 A1 | 12/2004 | Venkataraman et al. | |
| 2005/0132625 A1 | 6/2005 | Schewster | 40/564 |

OTHER PUBLICATIONS

SunLED Corporation, Guaranteed to Shine . . . , SunLED Corporation, Products—LED LAMPS—Special Shape, webpage images from www.sun-led.com.

(Continued)

*Primary Examiner*—Ali Alavi
*Assistant Examiner*—Robert May
(74) *Attorney, Agent, or Firm*—Baker, Donelson, Bearman, Caldwell & Berkowitz, PC

(57) ABSTRACT

A signage device (10) in which a housing (12) receives a circuit board (30) having a plurality of spaced-apart light sources (38) to define at least one symbol and overlaid by a message plate (42) having a projecting channel (46) with a translucent light emitting side (54) aligned with the light sources and a light blocking overlay sheet (60) defining an open slot (62) configured for mating reception of the projecting channel, whereby light from the light sources communicates from the light emitting surface of the channel extending from the overlay sheet.

32 Claims, 4 Drawing Sheets

OTHER PUBLICATIONS

GlobalSpec, The Engineering Search Engine, About Light Emitting Diodes (LED), webpage article from http://optical-components.globalspec.com.

SunLED Corporation, SunLED, Guaranteed to Shine . . . , XLxx20WLCR Series—An exceptional oval LED, webpage article from www.sun-led.com/Products/NewProducts/XLxx20.asp.

Zeon Corporation, Open Signs, Sign Specs, webpage images from http://store.yahoo.com/zeonsigns/opensigns.html.

Everything-Neon.com, Neon Open Signs, webpage images from http://store.everything-neon.com/neonopensigns.html.

Open Neon Sign, Neon Signs & More, webpage images from www.neon-signage.com/catalog/open_neon_sign_1618348.htm.

Open Neon Sign, Neon Signs & More, webpage images from www.neon-signage.com/catalog/open_neon_sign_1618468.htm.

Open Neon Sign, Neon Signs & More, webpage images from www.neon-signage.com/neon_open_signs.htm.

\* cited by examiner

US 7,086,769 B1

LED SIGNAGE DEVICE

TECHNICAL FIELD

The present invention relates to signage devices. More particularly, the present invention relates to illuminated signage devices for displaying messages of text and symbols.

BACKGROUND OF THE INVENTION

Signs are important devices used for display of information including text messages and symbols. Commercial establishments often use signs for attracting the attention of prospective customers. Signs provide readily observable information as to services and products offered at the business, as well as provide ornamental features, through display of symbols and graphics, including trademarks and logos.

Signs take on different forms, including printed non-illuminated signs and illuminated signs. Illuminated signs can be internally lighted or externally lighted. Neon signs are one type of internally lighted illuminated sign. Neon signs are formed from elongated glass tubes that are bent into shapes to form letters (typically) but also to form ornamental designs or symbols. The glass tube contains neon gas that upon excitement by high voltage illuminates with a vibrant color having a substantially even glow. The vibrant color attracts the attention of prospective customers while the even glow provides uniformity in appearance of the sign.

While neon signs are ornamentally attractive, there are drawbacks to their use. The glass tubes are susceptible to breakage, so neon signs must be handled with care and positioned so that they are not susceptible to contact or movement. Manufacture of neon signs is labor intensive, particularly in that the glass tubes are formed by hand craft. Neon signage typically is expensive due to these factors. Neon signage also requires strong, rigid supports for the glass tube and for the electrical equipment to power the sign.

Recently, developments have been made in signage devices that provide the advantageous illuminative effects of neon signage while reducing the susceptibility to these drawbacks. These developments include the use of discrete, brilliant light emitting sources, such as light emitting diodes (LEDS) that are disposed in a spaced-apart association with elongated thin-wall translucent members. However, the use of discrete light sources may create non-uniform emissions of light from the light emitting surfaces. These variations in intensity or "hot spots" result in light emission areas that are more brilliant than a desired overall uniformity of glow. In response, other developments have provided what is said to be enhanced uniformity with satisfactory brightness. Devices that gainfully use such developments however continue to require significant labor to manufacture.

Nevertheless, there remains a need in the art for signage devices that provide desirable neon light characteristics without the associated significant labor costs and while reducing the susceptibility of the signage devices to problems associated with neon signs and electronic signs that replicate neon signage lighting. It is to such that the present invention is directed.

SUMMARY OF THE INVENTION

The present invention meets the need in the art by providing a signage device in which a housing receives a circuit board having a plurality of spaced-apart light sources arranged to define a symbol. A message plate has a projecting channel with a translucent light emitting side that aligns with the light sources. A light blocking overlay sheet defines an open slot configured for mating reception of the projecting channel, whereby light from the light sources communicates from the light emitting surface of the channel extending from the overlay sheet.

Objects, features, and advantages of the present invention will become apparent upon reading the following detailed description in conjunction with the drawings and the appended claims.

DETAILED DESCRIPTION

Figure 1:
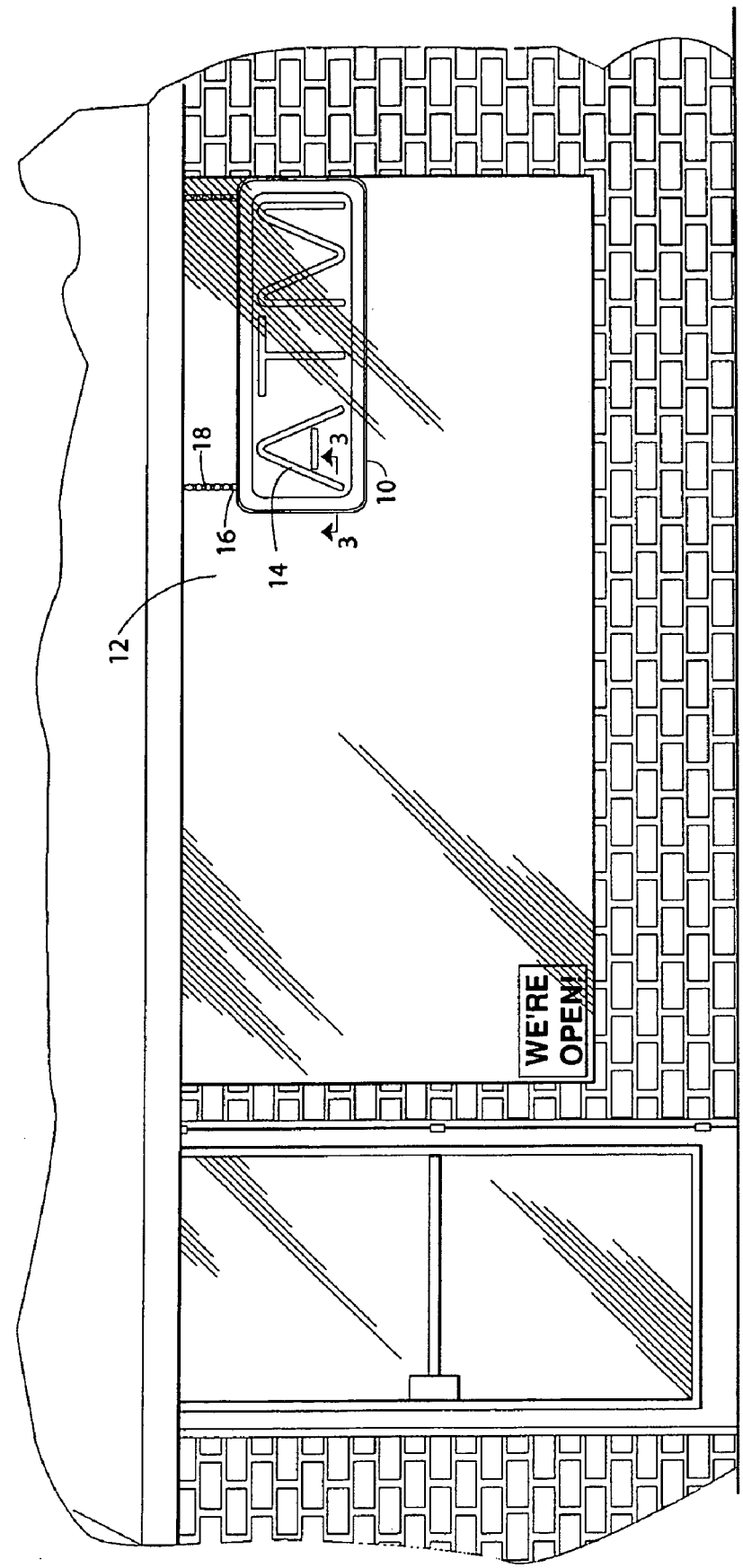
FIG. 1 is a perspective view of a signage device according to the present invention mounted in a store front window.

Turning now to the drawings, in which like parts have like identifiers throughout the several views, FIG. 1 illustrates in perspective view a signage device 10 according to the present invention used in a visual display in a window 12 of a commercial establishment. The signage device 10 includes at least one symbol-forming element 14, such as a letter or graphic design, for communicating a message. In the illustrated embodiment, the signage device 10 includes a pair of exterior loops 16 that attach to suspending members 18 for hanging the signage device from a support in the store front. Other mechanical supports, suspension structures, and presentation holders can be gainfully used with the signage device 10, and no further attention is directed such as being outside the scope of the present invention.

Figure 2:
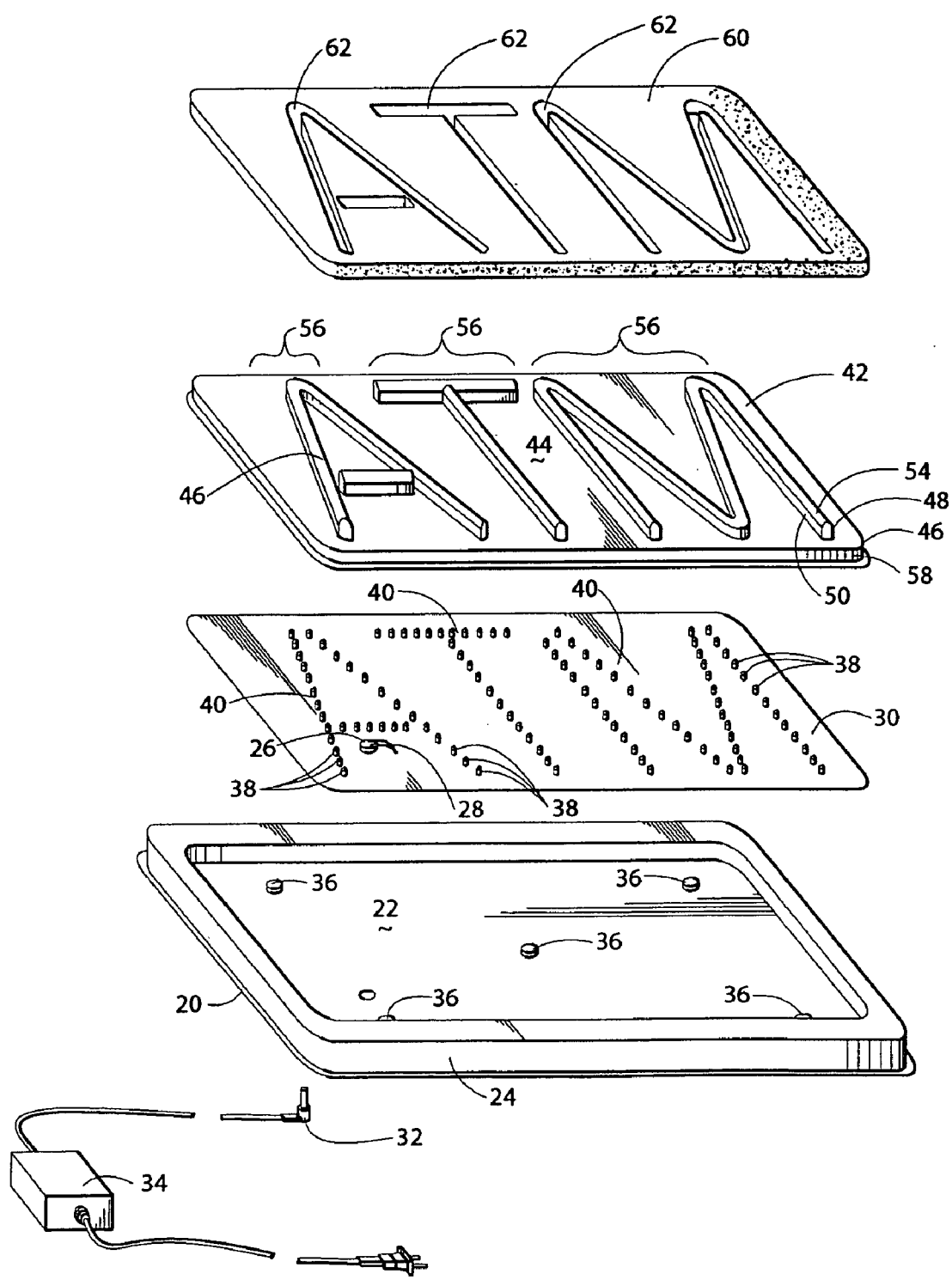
FIG. 2 is an exploded perspective view of the signage device illustrated in FIG. 1.

FIG. 2 illustrates in perspective exploded view the signage device 10 according to the present invention. The signage device 10 includes a housing or tray 20 having a bottom 22 and perimeter upstanding sidewalls 24. This defines a shallow recess or cavity. The bottom 22 defines an opening which receives an extended portion of an electrical socket 26. Electrical wires 28 extend from the electrical socket 26 to a circuit board 30. The electrical socket 26 receives a connector 32 that communicates an electrical current from a transformer 34 or other supply of electrical current.

The circuit board 30 mounts in the recess defined by the tray 20. A plurality of projections 36 extend in spaced-apart relation from the bottom 22 of the tray 20. The projections 36 dispose the circuit board 30 spaced-apart from the bottom 22. The electrical socket 26 mounts to the circuit board 30 and has a portion that extends through the opening in the bottom 22. In this embodiment, the socket 26 includes a threaded exterior, and a nut attaches to the exterior from outside the tray 20 to connect the circuit board 30 to the tray.

The circuit board 30 includes a plurality of point light sources 38 such as light emitting diodes (LEDs). The light sources 38 are connected in an electrical circuit for illuminating a plurality of the light source, and as such is well known in the art, no further discussion is made, except to note that the light sources or LEDs can be selectively illuminated in sequence, illuminated together, or illuminated randomly. It is to be further appreciated that while the LEDs may be of a common type or color, variation in color can be made by alternate LEDs, and as well as with different control circuitry for illuminating such. The light sources 38 are arranged in a pattern to display a symbol 40, such as a letter element of a text message, a graphic image, trademark image or logo, or other such symbol.

A sign plate 42 overlies the circuit board 30. The sign plate 42 is made from a sheet of translucent material having a substantially uniform thickness. The sign plate 42 includes a substantially planar portion 44 from which channels 46 extend in a first direction. The channels 46 in cross-sectional view have substantially parallel opposing sidewalls 48, 50 with an open side 52 and an opposing closed side 54 that defines a light emitting surface. In the illustrated embodiment, the channels 46 have arcuate distal ends for light emitting surfaces that suggest curved glass tubes of neon signs. However, the distal end of the channels 46 can have other cross-sectional shapes, including planar, non-planar, or projecting members, lugs, spikes, textures, or other ornamental treatments. The channels 46 cooperatively define at least one symbol 56 that corresponds in outline to the symbol 40 defined by the light sources 38 on the circuit board 30.

Figure 3:
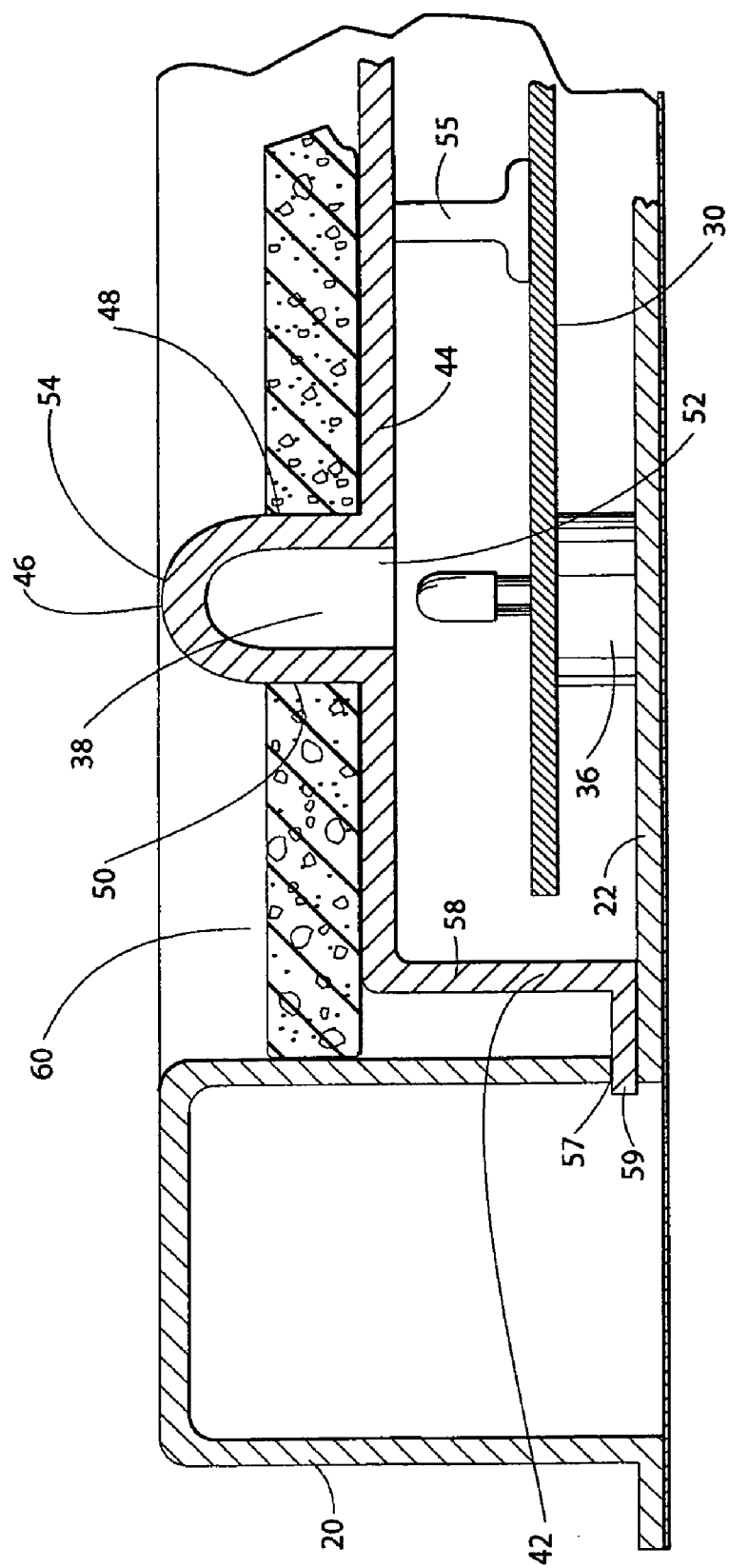
FIG. 3 is a cross-sectional view of the signage device illustrated in FIG. 1.

A perimeter skirt 58 extends substantially perpendicularly from the planar portion 44 in a direction opposing the projecting channels 46. As illustrated in FIG. 3, the sign plate 42 is sized so that the circuit board is received within the cavity defined by the planar portion 44 and the skirt 58. A distal edge of the skirt 58 seats on the bottom 22 of the tray 20. The height of the skirt 58 is selected to position the sign plate 42 in spaced relation to the light sources 38. Generally, the free distal end of the LED light source 38 is spaced-apart approximately ½ inch from the open side 52 of the channel 46. Further, the sidewalls 48, 50 are spaced approximately ½ inch apart, and the channel 46 projects approximately ¾ inch from the planar portion 44. As illustrated in FIG. 3, an alternate embodiment of the housing defines spaced-apart slots 57 in a side wall, which slots receive a tab or flange 59 extending laterally from a distal end of the skirt 58, to facilitate securing the sign plate to the housing. A feature of an alternate embodiment (illustrated for convenience in FIG. 3) provides spacers 55 disposed between the circuit board and the interior surface of the message plate to support extended portions of the message plate.

The sign plate 42 is readily manufactured using a conventional vacuum/heated molding process in which the translucent sheet is heated and the projections formed by vacuum pulling the softened flexible sheet into cavities defined in the mold. Further, dielectric or non-electrically conductive members can be disposed between the circuit board 30 and the sign plate 42 to support and space the sign plate 42 relative to the circuit board across the length and width of the sign plate.

With continuing reference to FIG. 2, the sign plate 42 receives a light-blocking overlay 60. The overlay 60 defines through slots 62 that align with the projecting channels 46 of the sign plate 42. The slots 62 are open on opposing major surfaces of the overlay 60. The openings or slots 62 are sized so that the edges of the overlay 60 closely conform to the exterior of the sidewalls 48, 50 of the channels 46 yet leave exposed the end 54 that defines the light emitting surface. The overlay 60 in the illustrated embodiment is a foam material.

With reference to FIG. 2, the signage device 10 assembles with the circuit board 30 received in the recess defined by the tray 20. The sign plate 42 seats over the circuit board 30 with the channels 46 in substantial alignment with the light sources 38. As illustrated in FIG. 3, the light sources 38 are preferably spaced-apart from the arcuate end 54 of the channels 46. The overlay 60 nests on the planar portion 44 with the slots 62 closely abutting the exterior sidewalls 48, 50 of the channels 46 to restrict light from communicating through the sidewalls 48, 50.

As illustrated in FIG. 3, the overlay 60 leaves an upper portion of the channel 46 exposed on lateral and distal surfaces to simulate round tube neon signage. However, other exterior ornamental features can be defined in the lateral and distal surfaces, as discussed above. With reference to FIG. 1, the assembled signage device 10 attaches to a support, such as with the illustrated suspenders 18 engaged to the loops 16. The circuit board 30 connects to a source of power through the adapter 32 connected by the transformer 34 to a supply of electrical current. The light sources 38 illuminate under the operational control of a control circuit. The light emitted from the light sources 38 communicates through the light emitting surface defined by the ends 54 of the channels 46, and thereby illuminate the symbols 56 defined by the channels in the sign plate 42.

It is to be appreciated that variances in the components of the signage device 10 have affects on the uniformity of the light emitted from the light emitting surface by the ends of the channels 46, the brightness of the light, and the possibility of "hot spots". This refers to portions of the light emitting surface having a brighter appearance than adjacent portions. The spacing between the point light sources 38 mounted to the circuit board 30 affects the brightness and the uniformity of the light emitted from the light emitting surfaces of the channels 46. Closer spacing between the channel and the point light sources increases perceived brightness, but may result in "hot spots". The selected intensity of the light sources 38 provide a selected brighter or dimmer light appearance. A brighter appearance however may lead to hot spots and a shorter life for the light source although fewer LEDs may be required. Light sources 38 which are less bright require more LEDs for comparable brightness to brighter light sources. Fewer light sources incurs lower costs but may have a less satisfactory level of brightness.

The light dispersing characteristics of the LEDs used for the light sources 38 affects the uniformity of the light emitted from the channels 46. This includes the focal angle, and the size and shape of the area that the light source uniformly lights. The light emitted through the channels 46 also is affected by the distance between the light sources 38 and the sign plate 42. Closer positioning provides less uniform light emission and potentially leads to hot spots. Changing the light transmissiveness of the translucent material for the sign plate 42 impacts the brightness and uniformity of the emitted light. A material that has lower light transmission properties results in decreased brightness but increased light uniformity over a material having greater light transmission properties. With these guidelines, one can appreciate how combinations of these variances can impact the brightness and uniformity of the emitted light.

In the illustrated embodiment, the LED light sources 38 are spaced on 0.5 inch centers and use COTCO LED model no. L0566THR4-70G 70° oval LED lamps in high red color with tinted defused lens and stopper. The light sources 38 are mounted to the circuit board 30 in alignment with a medial longitudinal axis of the channels 46 and are disposed about 0.5 inches below the opening of the projection 46 in the sign plate 42.

Figure 4:
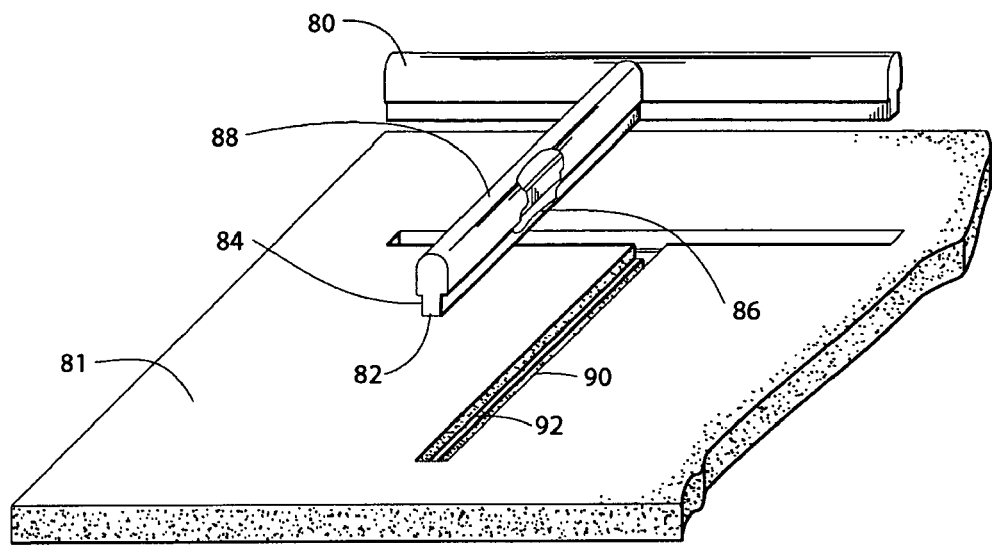
FIG. 4 illustrates in perspective exploded view a channel and sign plate for a second embodiment of a signage device according to the present invention.
Figure 5:
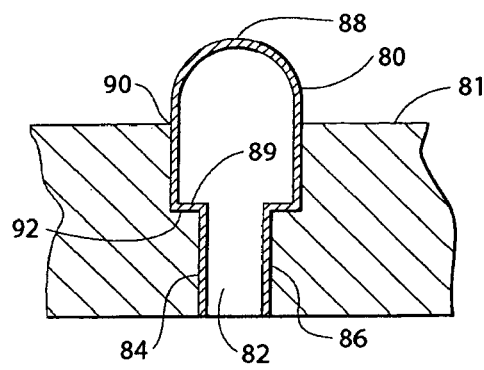
FIG. 5 is a cross-sectional view of the channel and sign plate illustrated in FIG. 4, taken along lines 5—5.

FIG. 4 illustrates in perspective view an elongated channel 80 exploded from a sign plate 81 useful in a sign device. The channel 80 is molded to have substantially uniform wall thicknesses and to define a letter, number, symbol, or portion thereof. The channel 80 defines an open bottom 82 having opposing side walls 84, 86 joined by a closed end or top 88 as a light emitting surface. The opposing longitudinally distal ends of the channel 80 are closed by walls. In the illustrated embodiment, the closed top 88 defines an arcuate light emitting surface. It is to be appreciated that other ornamental features, projections, spikes, points, surface textures, and the like, can be molded to define the closed top 88 of the channel 80. The sidewalls 84, 86 each define a inward portion having a step 89. The channel 80 seats in a through slot 90 formed in the sign plate 81. The through slot 90 that receives the channel 80 defines opposing inward shoulders 92 that supportingly contact the steps 89, as best illustrated in cross-sectional view in FIG. 5.

The steps 89 seat on the shoulders 92 of the slot 90, and thereby fixing the distal top 88 relative to a light source 38 (not illustrated). The sign plate 81 can be opaque to the transmission of light, or alternatively, include a light blocking coating, film, or other light-blocking member. In one embodiment, the sign plate 81 receives a painted coating. The sign plate 81 sits on the circuit board 30 in a sign housing, or with spacers, is disposed in spaced-apart relation to the circuit board.

Figure 6:
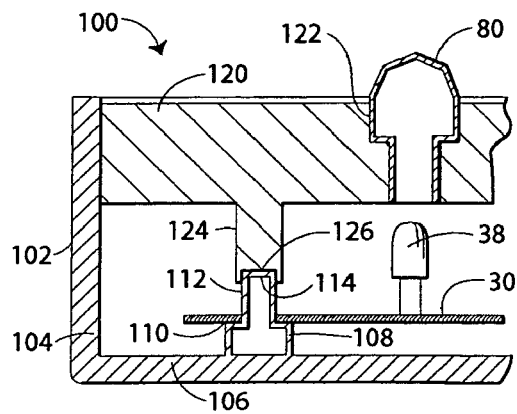
FIG. 6 is a cross-sectional view of a third embodiment of a sign device according to the present invention.

FIG. 6 illustrates in cross-sectional view a third embodiment of a sign device 100 according to the present invention. The sign device 100 includes a housing 102 having upstanding sidewalls 104 and a bottom 106. A plurality of support posts 108 extend upwardly from the bottom 106 (one of the support posts 108 is illustrated in FIG. 6). Each of the support posts defines an intermediate shoulder 110 and a connecting portion 112 that extends to a distal end 114. The circuit board 30 defines an opening through which the portion 112 extends, so that the circuit board 30 seats on the shoulders 110.

A sign plate 120 includes through slots 122 that define shapes for symbols, letters, numbers, and the like. The slots 122 receive channels 80 that conform to the slots. The sign plate 120 includes a plurality of extending supports 124. A distal end of each of the supports 124 defines a recess 126 that matingly engages the distal end 114 of an aligned one of the support posts 108. The connection of the support 124 and the post 108 spaces the sign plate 120 an appropriate distance from the light source 38 mounted to the circuit board 30 for communication of light through the channel 90. The side plate 120 is opaque as discussed above with respect to the sign plate 81, to restrict the communication of light except through the channel 80 received in the slot 122.

With reference to FIG. 2, it is to be appreciated that the sign plate 42 may comprise a plurality of adjacent sign plates 42 mounted in spaced-apart relation in the housing. For example, each discrete sign plate 42 can comprise an individual letter or number, which plate mounts in a grid held in the housing for readily assembling a particular sign.

Alternate embodiments of the light-blocking overlay 60 include an opaque paint or a thin sheet member that attaches to the sign panel 42, to define a light passageway therethrough substantially aligned with light sources 38.

The present invention accordingly provides a low cost, readily manufactured signage device using point light sources to affect a uniform glow in vibrant colors for simulating neon signage. The specification accordingly has described the present invention for an improved LED illuminated signage device, including the steps necessary for making and using various embodiments thereof. It is to be understood, however, that numerous changes and variations may be made in the construction of the LED illuminated signage devices within the spirit and scope of the present invention, and that modifications and changes may be made therein without departing from the scope thereof as set forth in the appended claims.

What is claimed is:

1. A signage device, comprising:
    a housing that receives a circuit board having a plurality of spaced-apart light sources to define at least one symbol;
    a message channel spaced from the circuit board and formed of a translucent material, having spaced-apart side walls and a closed distal side defining a light emitting surface opposing an open side of the message channel that is aligned with the light sources on the circuit board; and
    a light blocking overlay sheet defining an open slot configured for aligned reception of the message channel therein,
    whereby light from the light sources communicates from the light emitting surface of the distal side of the message channel.

2. The signage device as recited in claim 1, wherein the closed distal end is arcuate between the opposing side walls.

3. The signage device as recited in claim 1, wherein the closed distal end is non-planar.

4. The signage device as recited in claim 1, wherein the message channel defines a symbol corresponding to the symbol defined by the arrangement of the light sources.

5. The signage device as recited in claim 1, wherein the message channel is defined in a plate as a projecting channel extending from a planar portion thereof.

6. The signage device as recited in claim 5, wherein the plate further comprises a perimeter skirt extending from the planar portion in a direction opposing the projecting channel to space the channel from the light sources.

7. The signage device as recited in claim 6, wherein the message plate is sized to seat in overlying relation to the circuit board with a distal edge of the perimeter skin in contacting relation with an interior bottom surface of the housing.

8. The signage device as recited in claim 1, wherein the channel extends from an integral light plate having a relatively minor thickness and a relatively major longitudinal extent to define a thin plate having a major planar surface.

9. The signage device as recited in claim 8, wherein the distal side defines an arcuate light emitting surface between the side walls.

10. The signage device as recited in claim 1, wherein the light sources comprise light emitting diodes.

11. The signage device as recited in claim 1, wherein the housing further defines an opening therein; and further comprising an electrical socket attached to the circuit board and having a threaded exterior that extends through the opening; and a nut that threadedly received on the threaded portion of the electrical socket, for connecting the circuit board to the housing.

12. The signage device as recited in claim 11, wherein the light sources comprise light emitting diodes.

13. The signage device as recited in claim 1, wherein the symbol comprises an alphabetic character for a message.

14. The signage device as recited in claim 1, wherein the symbol comprises a non-alphabetic character.

15. The signage device as recited in claim 1, wherein the overlay sheet comprises a foam material.

16. The signage device as recited in claim 1, wherein the overlay sheet defines recessed opposing ledges on which the message channel seats.

17. The signage device as recited in claim 1, further comprising a plurality of spacers disposed between the circuit board and the interior surface of the message channel.

18. The signage device as recited in claim 1, wherein the housing further comprises supports for attaching the housing to a surface.

19. The signage device as recited in claim 1, wherein the circuit board defines a plurality of spaced-apart openings; and the housing includes a plurality of posts extending from a bottom through the openings to support the circuit board.

20. The signage device as recited in claim 19, wherein the overlay sheet defines a plurality of supports that align with the posts to space the overlay sheet from the circuit board.

21. The signage device as recited in claim 20, wherein the supports each define a recess at a distal end for mating engagement with a respective one of the posts.

22. A signage device, comprising:
    a housing having a back and an upstanding perimeter wall, the back defining an opening therein;
    a circuit board disposed within the housing and having a fastener extending through the opening in the back of the housing to secure the circuit board therein;
    a plurality of spaced-apart light sources mounted to the lighting circuit board to define at least one symbol;
    a message plate formed of a translucent material having a relatively minor thickness and a relatively major longitudinal extent to define a thin plate having a major surface that has a planar portion and a U-shaped projecting channel defining a distal surface between substantially parallel opposing side walls and an opening opposing the distal surface,
        the projecting channel defining a symbol corresponding to the symbol defined by the light sources,
        and a perimeter skirt extending from the planar portion in a direction opposing the projecting channel,
    the message plate received on the lighting circuit board with the light sources aligning with the channel, with an apex of the light source spaced from the distal surface of the channel by the skirt spacing the message plate from the circuit board;
    a light blocking overlay sheet defining an opening configured for mating reception of the projecting channel of the message plate therein,
    whereby light from the light sources communicates from the distal surface of the channel extending through the opening in the overlay sheet as a signage device.

23. The signage device as recited in claim 22, wherein the light sources comprise light emitting diodes.

24. The signage device as recited in claim 22, wherein the fastener comprises an electrical socket having a threaded exterior that extends through the opening in the back and connects to a nut, the electrical socket selectively attached to a supply of electricity for operating the circuit board.

25. The signage device as recited in claim 24, wherein the light sources comprise light emitting diodes.

26. The signage device as recited in claim 22, wherein the symbol comprises an alphabetic character for a message.

27. The signage device as recited in claim 22, wherein the overlay sheet comprises a foam material.

28. The signage device as recited in claim 22, further comprising a plurality of spacers disposed between the circuit board and the interior surface of the message plate.

29. The signage device as recited in claim 22, wherein the housing further comprises supports for attaching the housing to a surface.

30. The signage device as recited in claim 22, wherein the circuit board defines a plurality of spaced-apart openings; and the housing includes a plurality of posts extending from a bottom through the openings to support the circuit board.

31. The signage device as recited in claim 30, wherein the overlay sheet defines a plurality of supports that align with the posts to space the overlay sheet from the circuit board.

32. The signage device as recited in claim 31, wherein the supports each define a recess at a distal end for mating engagement with a respective one of the posts.

* * * * *